(12) United States Patent
Lumley

(10) Patent No.: US 6,784,860 B2
(45) Date of Patent: Aug. 31, 2004

(54) DISPLAY

(75) Inventor: John William Lumley, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 322 days.

(21) Appl. No.: 10/073,884

(22) Filed: Feb. 14, 2002

(65) Prior Publication Data

US 2002/0109670 A1 Aug. 15, 2002

(30) Foreign Application Priority Data

Feb. 15, 2001  (GB) .............................................. 0103730

(51) Int. Cl.⁷ ................................................ G09B 3/34
(52) U.S. Cl. .................... 345/87; 340/310.08; 340/687; 439/59; 439/65; 439/144; 439/630; 439/650; 439/651; 439/654
(58) Field of Search ....................... 345/87; 340/310.08, 340/687; 439/59, 65, 630, 650, 651, 654, 144

(56) References Cited

U.S. PATENT DOCUMENTS

| | | | | |
|---|---|---|---|---|
| 4,090,091 A | * | 5/1978 | Brown et al. ................ | 307/116 |
| 4,701,002 A | * | 10/1987 | Mouissie .................... | 439/426 |
| 4,742,345 A | | 5/1988 | Di Santo et al. ........... | 340/787 |
| 5,410,182 A | * | 4/1995 | Kurafuchi et al. .......... | 257/692 |
| 5,467,210 A | | 11/1995 | Kishigami ................... | 359/88 |
| 5,906,517 A | * | 5/1999 | Crane et al. ................ | 439/654 |
| 6,293,467 B1 | * | 9/2001 | Reddersen et al. ..... | 235/462.15 |
| 6,550,136 B1 | * | 4/2003 | Hata et al. ................... | 29/846 |
| 6,626,697 B1 | * | 9/2003 | Martin et al. ............... | 439/488 |
| 6,629,048 B1 | * | 9/2003 | Law et al. .................... | 702/64 |

FOREIGN PATENT DOCUMENTS

WO          00/58204          10/2000

* cited by examiner

Primary Examiner—Bipin Shalwala
Assistant Examiner—Vincent E. Kovalick
(74) Attorney, Agent, or Firm—Foley & Lardner LLP

(57) ABSTRACT

This invention relates to a detachable display 10, in particular to a detachable liquid crystal display for an electronic device. The display 10 has a first plate 12, a second plate 14 parallel to the first plate 12, and a layer of liquid crystal material 16 between the first plate 12 and the second plates 14. So that the liquid crystal material 16 can be addressed, a plurality of X address lines 20 are provided on the first plate 12, and a plurality of Y address lines 22 are provided on the second plate 14. The X address lines 20 and the Y address lines 22 are each respectively connected to X contacts and Y contacts, the X contacts and Y contacts being positioned along a single connecting edge 32 of the display, so that the display can be connected/disconnected to/from a matching connector by simply sliding connecting edge 32 of the display 10 into/out of the connector.

18 Claims, 4 Drawing Sheets

DISPLAY

This invention relates to a detachable display, in particular to a detachable liquid crystal display for an electronic device.

Liquid crystal displays normally have X address lines and Y address lines, the X address lines and the Y address lines residing on either side of a layer of liquid crystal material. The X address lines and the Y address lines are normally orthogonal to one another so that when a voltage is applied between an X address line and a Y address line, an electric field is produced in the vicinity of the point where the X address line and the Y address line overlap, thereby causing a change in the optical properties of the liquid crystal material in this vicinity.

An electrical contact to an address line is normally made by a wire soldered to the end of the address line. Electrical contacts to the X address lines are made at one edges of the display, and electrical contacts to the Y address lines are made at another edge of the display, the two edges being orthogonal to one another.

The wires can then be electrically connected to one end of a lead, the other end of the lead having a plug attached thereto so that the display can be electrically connected to an electronic device having a socket for receiving the plug. The display can then be detached from the electronic device by removing the plug from the socket. However, such an arrangement is not always convenient.

It is one object of the present invention to address these issues.

According to one aspect of the present invention, there is provided a display comprising: a display panel with a display area and around the display area, a plurality of sides and a connecting edge along one side thereof for detachably connecting the display to a matching electrical connector; a plurality of X address lines extending across the display panel in one direction, each X address line having an X contact; and a plurality of Y address lines extending across the display panel in another direction, each Y address line having a Y contact, wherein the X contacts and the Y contacts lie along the connecting edge.

Because the X contacts and the Y contacts lie along the connecting edge, the display can be connected to and removed from the electrical connector easily, allowing a display connected to the connector to be easily interchanged with another display.

Preferably, each X address line has an addressing portion for addressing a portion of the display area, and a connecting portion for making an electrical connection between an X contact and a corresponding X addressing portion, wherein each of the addressing portions of the X address lines extends in the direction of the connecting edge, and each of the connecting portions of the X address lines extends at an acute angle relative to the direction of the connecting edge, between the corresponding X contact and addressing portion. This will allow a connection between the X contact and the address portion of X address line to be made more simply and more reliably.

Each Y address line will preferably have an addressing portion for addressing a portion of the display area, and a connecting portion for making an electrical connection between a Y contact and a corresponding Y addressing portion, wherein each of the addressing portions of the Y address lines extends in a direction transverse to the direction of the connecting edge, and each of the connecting portions of the Y address lines extends transverse to the direction of the connecting edge between the corresponding addressing portion and Y contact. Because the Y addressing portions extend in a direction transverse to the direction of the connecting edge, each of the Y addressing portions will cross the X address addressing portions, allowing an electric field to be applied at the points where each Y addressing portion crosses an X addressing portion.

The display may have a first face, and parallel to the first face a second face, the display area extending across the first face and/or the second face, wherein the X contacts are accessible from the first face and the Y contacts are accessible from the second face. This will allow the display to be connected to a connector of the slot-type, the connector having two displaced parallel surfaces, one parallel surface having thereon a plurality of X connector pads, and the other surface having thereon a plurality of Y connector pads. The connector pads may have the form of pins or brushes, resilient or rigid, and may have connecting members shaped so as to receive or be received by a corresponding X or Y contact.

The X contacts and/or the Y contacts may each have a contact region, the contact region of each X contact residing in a first plane, and the contact region of each Y contact residing in a second plane displaced and parallel to the first plane. The contact region of each X and/or Y contacts may be substantially flat.

The display will preferably have a first plate and a second plate with an optical medium therebetween, the optical medium being addressable by the X and Y address lines, the X address lines being provided on the first plate and the Y address lines being provided on the second plate. The first and/or second plate will preferably be transparent, so that the optical medium can be viewed.

In order to reduce the risk of the X addressing portions becoming shorted together, either by the connecting portions or otherwise, the addressing portions of the X address lines will preferably be strips of conducting material deposited on an inwardly facing surface of the first plate and the connecting portions of the X address lines will preferably be strips of conducting material deposited on an outwardly facing surface of the first plate. Such an arrangement will reduce the need for an additional insulating layer to be deposited on the first plate between the addressing portions and the connecting portions of the X address lines.

So that connecting windows do not need to be formed through the first plate, the connecting portions of the X address lines will preferably be connected to the addressing portion of the X address lines at an edge of the first plate, not being the connecting edge.

In a preferred embodiment, the display panel will be substantially square or substantially rectangular and the Y address lines and the X address lines will be perpendicular to one another.

In order for the display to electrically connect to the connector in one orientation only, the X contacts and the Y contacts may each be placed along the connecting edge at regular intervals, the intervals between the X contacts being different from the intervals between the Y contacts. Hence if the display is inadvertently inserted into the connector the wrong face up, the X contacts and Y contacts will not line up with the respective X and Y connector pads on the connector.

The display may be flexible so that it can be handled like a sheet of paper when it is removed from the connector.

The optical medium may be a liquid crystal medium. The liquid crystal medium may be bistable, such that the display area holds an image following addressing of the display. An image can then be written over the display area by addressing the X and Y address lines, and the display can then be removed from the connector and stored, in a similar way to conventional paper.

According to another aspect of the invention, there is provided a display assembly comprising an electrical connector and a display, wherein the display has:

a display panel with a display area, and around the display area a plurality of sides and a connecting edge along one side thereof for detachably connecting the display to the electrical connector;

a plurality of X address lines extending across the display panel in one direction, each X address line having an X contact; and, a plurality of Y address lines extending across the display panel in another direction, each Y address line having a Y contact, wherein the X contacts and the Y contacts lie along the connecting edge, and wherein the electrical connector is capable of receiving the connecting edge of the display, the electrical connector having a plurality of X connector pads for contacting the X contacts, and a plurality of Y connector pads for contacting the Y contacts, such that when the connector edge of the display is received in the electrical connector, some or all of connector pads connect to the contacts on the display.

Preferably, at least the X contacts will each be placed along the connecting edge of the display at regular intervals, and at least the X connector pads will each be placed at regular intervals on the electrical connector, the size of the intervals between the X connector pads being equal to at most half the size of the interval between the X contacts, and a sensing circuit will preferably be provided for sensing which X connector pads on the connector are connected to the X contacts on the display.

Because the size of the intervals between the X connector pads are equal to at most half of the size of the intervals between the X contacts, the display does not need to be aligned along the direction of the connecting edge in order for each of the X contacts to connect to at least one X connector pad. This will be particularly important, since typically the connecting edge will have about 50 X contacts or more per cm.

The connector assembly may be connected to a computer device, in which case the sensing circuit may be provided within the computer device.

The connecting edge need not be part of a display, and may be part of a plug, the X and/or Y contacts being connected to wires leading to an electronic device. Therefore, according to yet another aspect of the invention, there is provided a connector system comprising a plug and an electrical connector, the plug and the electrical connector being capable of releasably engaging with one another, wherein:

the plug has a connecting edge and a plurality of contacts located along the connecting edge at regular intervals, and the electrical connector has a plurality of connector pads for contacting the contacts, the connector pads being arranged at regular intervals;

the size of the intervals between the connector pads is at most half of the size of the intervals between the contacts, such that when the connector edge of the first plug is received in the electrical connector, each contact connects to at least one connector pads; and a sensing circuit is provided for sensing which connector pads on the connector are connected to the contacts on the plug.

The invention will now be further described, by way of example, with reference to the following drawings in which.

Figure 1:
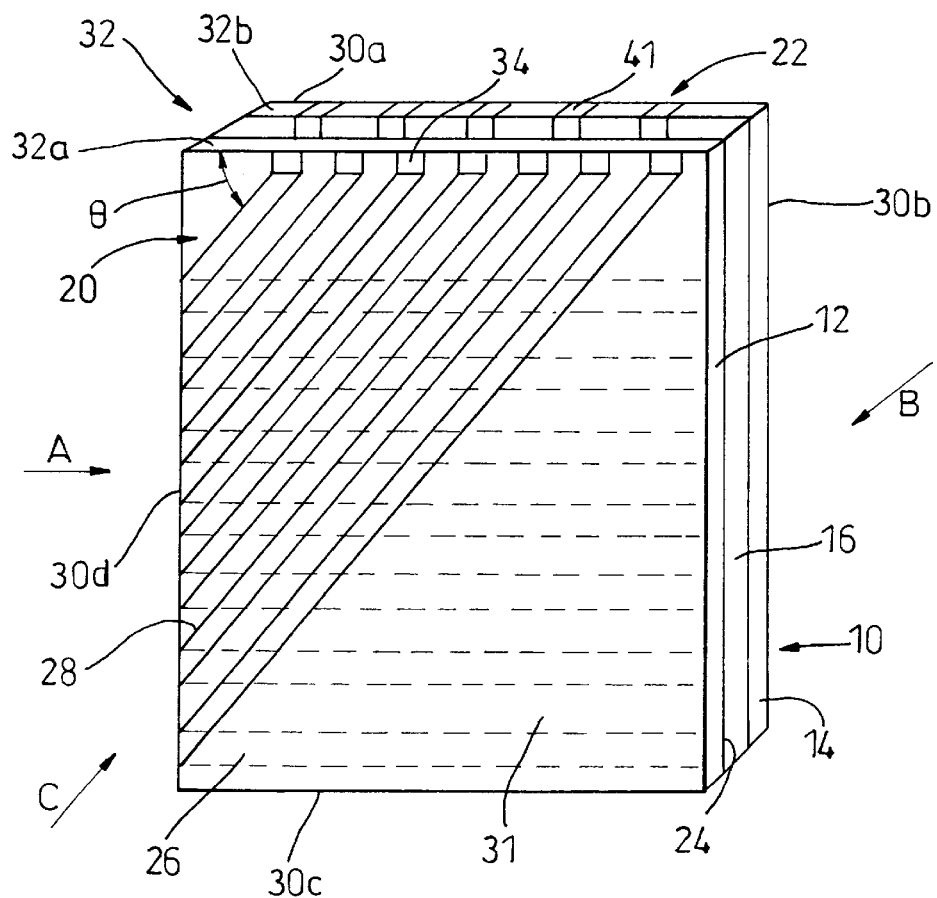
FIG. 1 shows a perspective view of a display with a first panel and a second panel according to one aspect of the invention.

In FIG. 1 there is shown schematically a perspective view of a display 10 having a first plate 12, a second plate 14 parallel to the first plate 12, and a layer of liquid crystal material 16 between the first plate 12 and the second plates 14. So that the crystal material 16 can be addressed, a plurality of X address lines 20 are provided on the first plate 12, and a plurality of Y address lines 22 are provided on the second plate 14.

The display 10 is rectangular, having a display area 31 in a central portion thereof for displaying an image, and having four straight edges 30a,30b,30c,30d around the display area 31. Along one side 30a, there is provided a connecting edge 32 having a plurality of X contacts 34 and a plurality of Y contacts 41 arranged therealong for making an electrical connection to the X address lines 20 and the Y address lines 22 respectively. The connecting edge 32 of the display 10 is formed by a top edge 32a of the first plate 12 and a top edge 32b of the second plate, the two top edges 32a and 32b being parallel to one another and displaced by the width of the liquid crystal layer 16. (The term top is used here only with respect to the orientation of the drawings). The X contacts are positioned on the top edge 32a of the first plate 12, and the Y contacts are positioned on the top edge 32b of the second plate 14.

Figure 2:
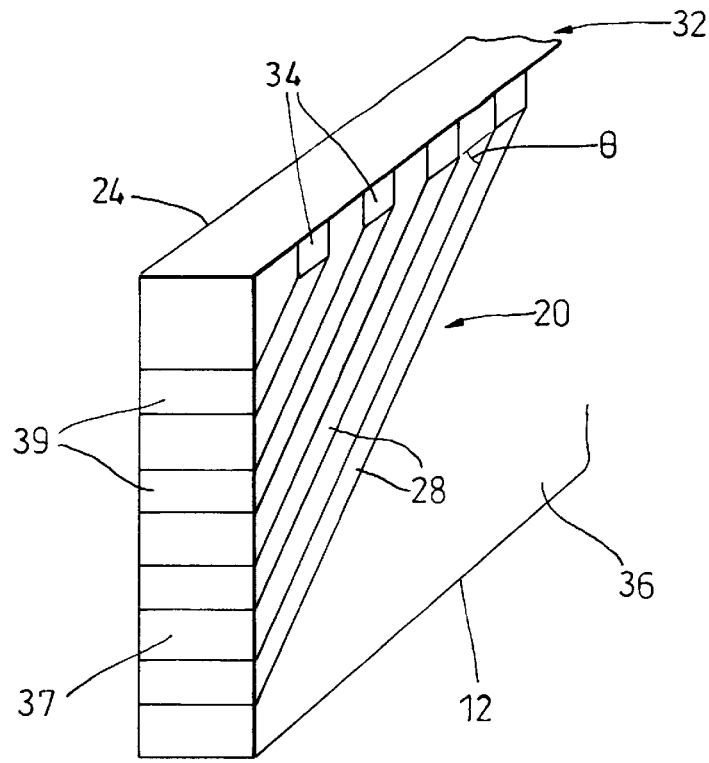
FIG. 2 shows a perspective view of the first panel of FIG. 1 looking along the direction marked A.
Figure 3:
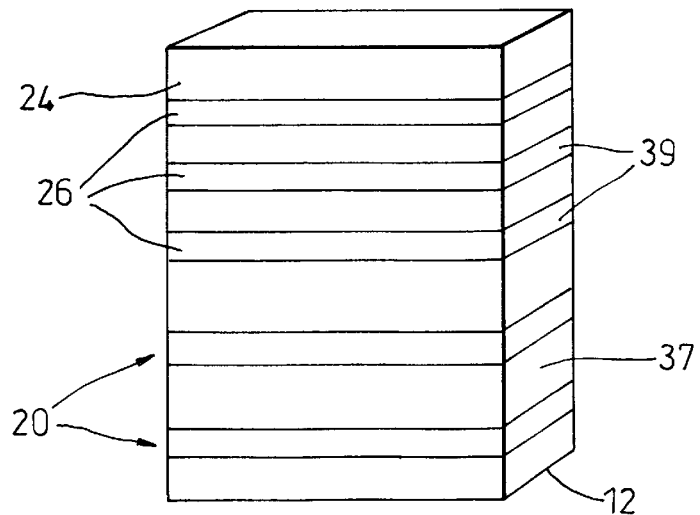
FIG. 3 shows a perspective view of the first panel of FIG. 1 looking along the direction marked B.

The arrangement of the address lines 20 on the first plate 12 can be seen in more detail in FIGS. 2 and 3, which show perspective views of the first plate 12. On the inwardly facing side 24 of the first plate (facing the layer of liquid crystal material 16) there are provided a plurality of X address portions 26, each X address portion 26 being a strip of electrically conducting material extending in a straight line across the inwardly facing side 24 of the first plate 12, parallel to the connecting edge 32 (the X address portions 26 are indicated by dashed lines in FIG. 1). A plurality of connecting portions 28 in the form of conducting strips are disposed at regular intervals along the outwardly facing surface 36 of the first plate 12, each connecting portion 28 forming an electrical connection between an X contact 34 and an X addressing portion 26. So as to reach the addressing portions 26, each connecting portion 28 extends across one of the edges 30d of the first plate 36, thereby forming a bridge 39 between the outwardly facing side 36 and the inwardly facing side 24 of the first plate 12.

The edge 30d of the first plate 36 across which the addressing portions 26 extend is perpendicular to the connecting edge 32. The connecting portions 28 are substantially straight and substantially parallel to one another, extending in a diagonal direction between this perpendicular edge 30d and the connecting edge 32 such that an acute angle θ is formed between each addressing portion 26 and the contacting edge 32.

Figure 4:
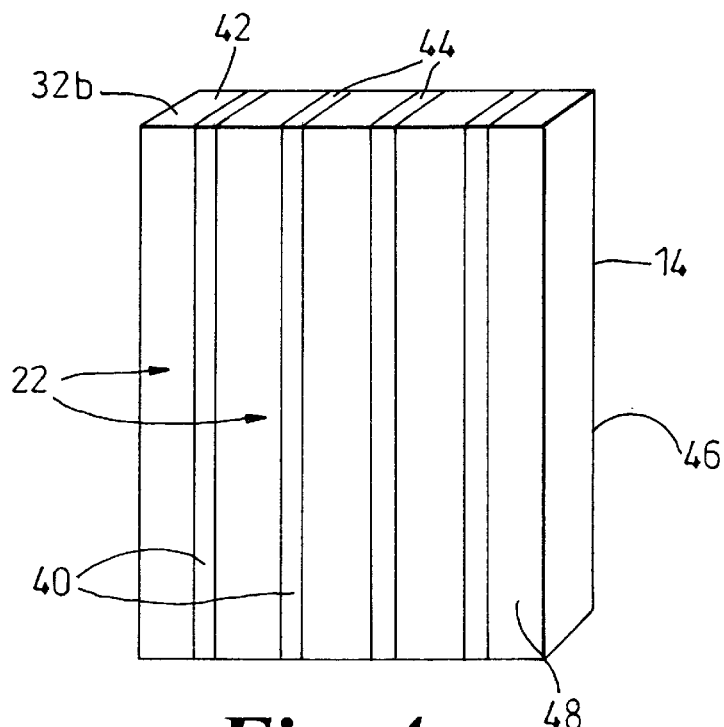
FIG. 4 shows a perspective view of the second panel of FIG. 1 looking along the direction marked C.
Figure 5:
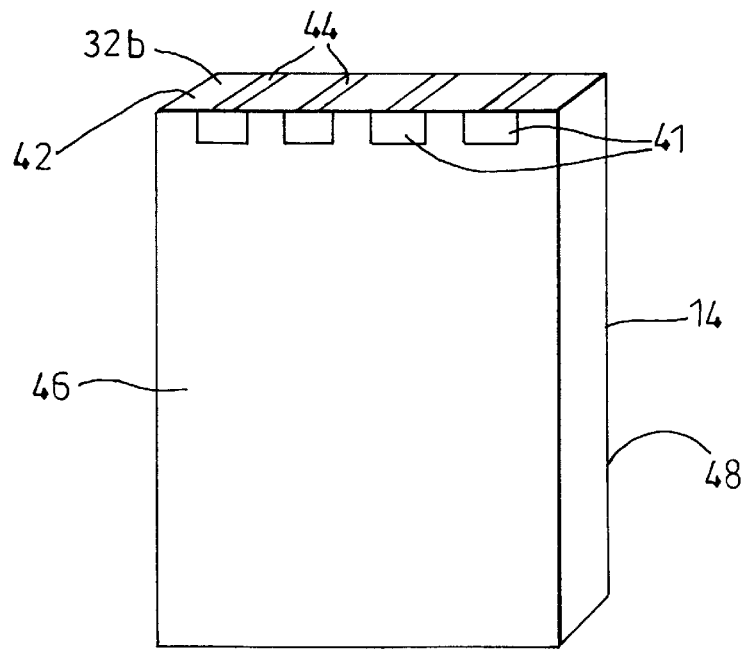
FIG. 5 shows a perspective view of the second panel of FIG. 1 looking along the direction marked B.

The second plate 14 can be seen in FIGS. 4 and 5. The Y address lines 22 each have a Y addressing portion 40, situated on the inwardly facing surface 48 of the second plate 14, and a Y connecting portion 44. The Y connecting portions 44 each connect a Y addressing portion 40 to a respective Y contact 41 lying on the outwardly facing surface 46 of the second plate 14. The connecting portions 44 each extend across the top edge 32b of the second plate, so as to each form a bridge between the inwardly facing surface 48 and the outwardly facing surface 46 of the first plate 14.

The X contacts 34 and the Y contacts 41 are each formed by pads lying on the outer surfaces 36 and 46 of the first and second plates 12, 14 respectively, close to the respective top edges 32a and 32b.

The X and Y connecting portions 28, 44 as well as the X and Y addressing portions 26, 40 are formed from conducting strips of Indium Tin Oxide deposited on the first and second plated 12, 14 respectively.

Figure 6:
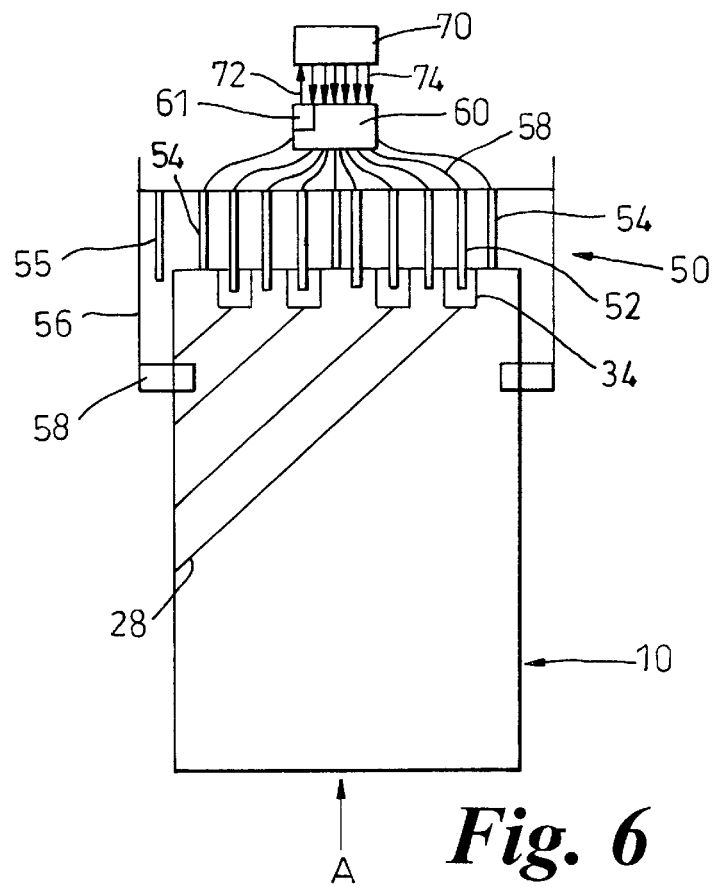
FIG. 6 shows a planar view of a connector assembly with a display.
Figure 7:
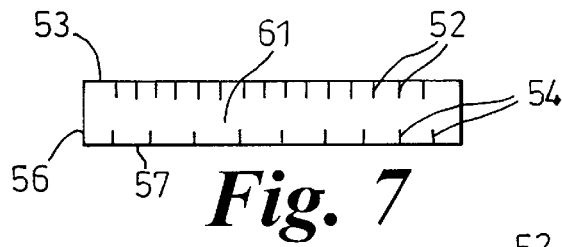
FIG. 7 shows a schematic view of the connector assembly in FIG. 6 but without a display, looking in the direction marked A.

In FIG. 6, there is shown a plan view of a display 10 whose connecting edge 32 is located in a connector assembly 50. The connector assembly 50 has a plurality of X connector pads 52 and a plurality of Y connector pads 54 for respectively making contact with the X contacts 34 and the Y contacts 41 on the display 10. As can be seen from FIG. 7, the X connector pads 52 and the Y connector pads 54 are each arranged in at intervals along a respective support member 53, 57 extending in a lateral direction. The support members 53, 57 are parallel and spaced apart so as to from an elongate slot 61, the long axis of the slot 61 lying generally parallel with the connecting edge 32 of the display 10 when the display is received in the connector assembly as shown in FIG. 6.

The connector assembly 50 has a casing 56 on or in which there is mounted guide means 58 for guiding the display 10 such that the contacting edge 32 can slide into the connector assembly 50, and into a position where the X connector pads 52 bear against the X contacts 34 and the Y connector pads 54 bear against the Y contacts 41.

The interval between X connector pads 52 and the interval between Y connector pads 54 on the connector assembly 50 is smaller than the respective intervals between X contacts and Y contacts on the display 10, so that the X address lines 20 and the Y address lines 22 can be contacted without having to align the connecting edge 32 in the lateral direction when inserting the connecting edge 32 into the connector assembly 50.

Figure 8:
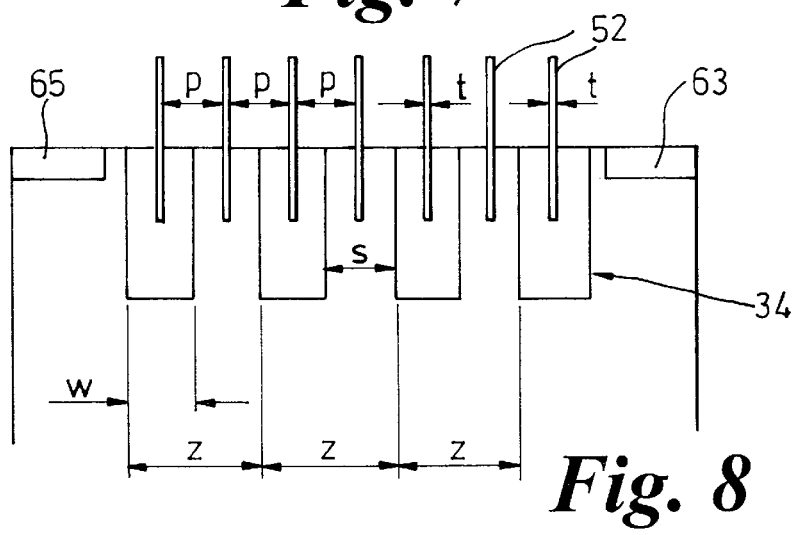
FIG. 8 shows in a plurality of pads on the connector of FIG. 6 making contact with a plurality of contacts on the display; and, FIG. 9 shows a connector system according to another aspect of the invention.

FIG. 8 shows in more detail a plurality of X connector pads 52 and X contacts 34 (for clarity FIG. 8 is directed at X contacts only but it will be appreciated that the following description is applicable also to the Y contacts 54). Because the width t of the X connector pads 52 is less than the spacing s between X contacts 32, a connector pad 52 will not make a shorting connection between two adjacent X contacts 34. The width w of the X contacts 34 and the interval p between X connector pads 52 are equal and are each half the interval i between contacts; i.e. w, p and i satisfy the relation: 0.5i=w=p. Consequently, each X contacts 34 is in register with at least one X connector pad 52, without having to align the connecting edge in the lateral direction.

Because the number of X connector pads 52 on the connector assembly 50 is greater than the number of X contacts on the display 10, not all X connector pads 52 will make contact with an X contact. Some X connector pads 52 will lie between X contacts and other X connector pads 52 will lie beyond one end of the contacting edge 32.

Each X connector pad is connected by a wire 58 to a sensing unit 60, the sensing unit being operable to determine whether or not an X connector pad 52 is connected to an X contact 34. A driver unit 70 is provided to drive each X and Y address line 20, 22 with a drive signal 74, the driver unit 70 being connected to the sensing unit 60 so as to receive a sensing signal 72 containing information on which X or Y contacts 34, 41 are connected to an X or Y connector 52, 54. The sensing signal 72 may contain information on the strength and/or timing of the driving signal 74 for driving each address line 20, 22, to take into account for example the different capacitance of the different address lines 20, 22 on a given display 10. Capacitance circuitry 61 will be provided in the sensing unit 60 for measuring the capacitance of the X address lines 20 connected to X contact pads 52.

The display 10 may be addressed sequentially and refreshed by the driver 70 in a cyclic manner, or alternatively the display 10 may be an active matrix display.

The capacitance circuitry 61 provided in the sensing unit 60 can measure the capacitance of an X connector pad 52. From the capacitance of an X connector pad 52, it will be possible to determine if the connector pad 52 is connected to an X address line 20, since the capacitance of the X connector pad 52 will be different depending on whether or not it is connected. The sensing unit 60 will also have circuitry therein for measuring the resistance between two adjacent X connector pads 52 to determine if these are connected to the same X contact 34.

The length of the connecting edge 32 is less than the length of the slot 61, so that the connecting edge 32 may be inserted in the slot in different lateral positions. If desired, the display 10 may be removed from the connector and replaced with a different display having a longer or shorter connecting edge. Because the X connector pads 52 and the Y connector pads 54 are more closely spaced than the X contacts 34 and Y contacts 41 respectively, the display 10 need not be laterally aligned for each X and Y contact 34, 41 to be connected to at least one X or Y connector pad 52, 54.

A conducting region 63, 65 will optionally be provided at each end of the connecting edge 32, each conducting region 63, 65 having a width such that at least two adjacent connector pads 52 are connected together by each conducting region 63, 65 when the display 10 is received in the connector assembly. The sensing unit 60 will then be operable to detect which two adjacent X connector pads 52 or adjacent Y connector pads 54 are connected together, thereby enabling the width and/or position of the display 10 connected to the connector assembly to be determined. Alternatively, the sensing unit 60 may detect which adjacent X contact pads or adjacent Y contact pads are not connected to the connecting edge, in order to determine the width and/or position of the display 10.

The connector assembly 50 may be connected to a personal computer to enable writing to the display. It is particularly advantageous for the display to be bistable. The elements of a bistable display have two separate stable states. This means that unlike a conventional display, which needs to be powered in order to display information, power is needed only to change the state of the display whatever the state of information displayed upon it. Bistable displays are generally based upon liquid crystals with appropriate properties. Examples are surface stabilised ferroelectric liquid crystal device (SSFELCDs) (L J Yu, H Lee, C S Bak and M M Labes, Phys Rev Lett 36, 7, 388 (1976); R B Meyer, Mol Cryst Liq Cryst. 40, 33 (1977); N A Clark and S T Lagerwall, Appl Phys Lett, 36, 11, 899 (1980)); bistable nematic devices (WO97/14990 and GB.2,286,467-A) and surface stabilised FLC devices (SSFLC) (N. A. Clark and S. T. Lagerwall, Appl. Phys. Lett., 36, 899 (1980)).

Figure 9:
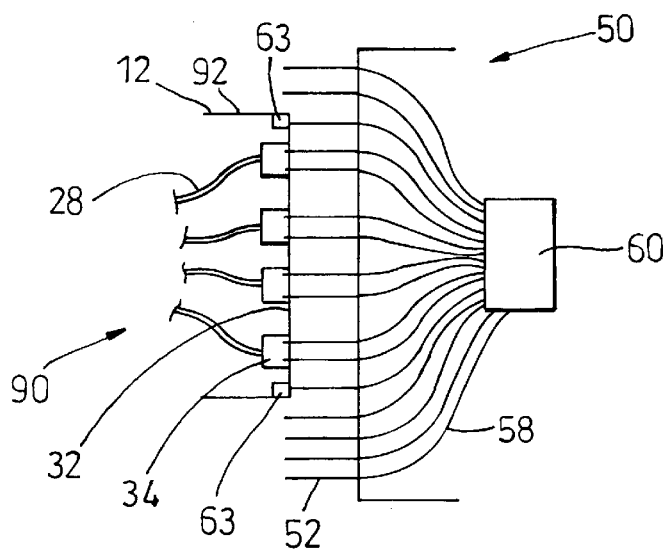

Such a bistable display has a major advantage over conventional displays. It can be connected to the computer, written on, disconnected from the computer and then stored in the same way as conventional paper, because no power is needed to maintain the display in its written state A connector system 90 is shown in FIG. 9 having a plug 92 and a releasable connector 50. The plug 90 has a plate 12 with a connecting edge 32. A plurality of contacts 34 lie upon the connecting edge, each contact having a wire 28 leading therefrom. The plug 90 is releasably engaged with the connector 50, the connector 50 having a plurality of pads 52 arranged at regular intervals along a line, for making electrical contact to the contacts 34.

The number of pads per unit distance on the connector is greater than the number of contacts 34 per unit distance along the connecting edge 32. The connecting edge 32 is shorter than the length of the connector 50, so that, in a similar fashion to the connector of FIGS. 6 to 8, the connector 50 may accept the plug 90 different lateral positions, and one or more connector pads 52 on either side of the plug 90 may not lie on the connecting edge.

A sensing unit 60 is provided to determine which pads 52 are connected to a contact 34. Since pads 52 on either side of the contact will not be connected, the sensing unit 60 will be able to determine the lateral position of the plug 90. The connecting edge 32 may have a conducting region 63 at one end or both ends, the conducting region being large enough to short two adjacent connector pads 52, so that the sensing unit can more easily determine the position of the plug 90 in the connector 50.

What is claimed is:

1. A display comprising: a display panel with a display area and around the display area, a plurality of sides and a connecting edge along one side thereof for detachably connecting the display to a matching electrical connector; a plurality of X address lines extending across the display panel in one direction, each X address line having an X contact; and a plurality of Y address lines extending across the display panel in another direction, each Y address line having a Y contact;

wherein the X contacts and the Y contacts lie along the connecting edge; each X address line has an addressing portion for addressing a portion of the display area, and a connecting portion for making an electrical connection between an X contact and a corresponding X addressing portion; and wherein each of the addressing portions of the X address lines extends in the direction of the connecting edge, and each of the connecting portions of the X address lines extends at an acute angle relative to the direction of the connecting edge, between the corresponding X contact and addressing portion.

2. A display as claimed in claim 1, wherein each Y address line has an addressing portion for addressing a portion of the display area, and a connecting portion for making an electrical connection between a Y contact and a corresponding Y addressing portion, wherein each of the addressing portions of the Y address lines extends in a direction transverse to the direction of the connecting edge, and each of the connecting portions of the Y address lines extends transverse to the direction of the connecting edge between the corresponding addressing portion and Y contact.

3. A display as claimed in claim 1, the display having a first face, and parallel to the first face a second face, the display area extending across the first face and/or the second face, wherein the X contacts are accessible from the first face and the Y contacts are accessible from the second face.

4. A display as claimed in claim 1, the display area having a first plate and a second plate with an optical medium therebetween, the optical medium being addressable by the X and Y address lines, wherein the X address lines are provided on the first plate and the Y address lines are provided on the second plate.

5. A display as claimed in claim 4, wherein the addressing portions of the X address lines are strips of conducting material deposited on an inwardly facing surface of the first plate and the connecting portions of the X address lines are strips of conducting material deposited on an outwardly facing surface of the first plate.

6. A display as claimed in claim 5, wherein the connecting portions of the X address lines are connected to the addressing portion of the X address lines at an edge of the first plate, not being the connecting edge.

7. A display as claimed in claim 4, wherein the optical medium is a liquid crystal medium.

8. A display as claimed in claim 7, wherein the optical liquid crystal medium is bistable, such that the display area holds an image following addressing of the display.

9. A display as claimed in claim 4, wherein the addressing portions of the Y address lines are strips of conducting material deposited on an inwardly facing surface of the second plate and the connecting portions of the Y address lines are strips of conducting material deposited on an outwardly facing surface of the second plate.

10. A display as claimed in claim 9, wherein the connecting portions of the Y address lines are connected to the addressing portion of the Y address lines at an edge of the second plate, said edge of the second plate being on the connecting edge of the display.

11. A display as claimed in claim 1, wherein the display panel is substantially square or substantially rectangular.

12. A display as claimed in claim 1, wherein the Y address lines and the X address lines are perpendicular to one another.

13. A display as claimed in claim 1, wherein the X contacts and the Y contacts are each placed along the connecting edge at regular intervals, the intervals between the X contacts being different from the intervals between the Y contacts.

14. A display as claimed in claim 1, wherein the display panel is flexible.

15. A display assembly comprising an electrical connector and a display, wherein the display has:

a display panel with a display area, and around the display area a plurality of sides and a connecting edge along one side thereof for detachably connecting the display to the electrical connector;

a plurality of X address lines extending across the display panel in one direction, each X address line having an X contact; and, a plurality of Y address lines extending across the display panel in another direction, each Y address line having a Y contact, wherein the X contacts and the Y contacts lie along the connecting edge, and wherein the electrical connector is capable of receiving the connecting edge of the display, the electrical connector having a plurality of X connector pads for contacting the X contacts, and a plurality of Y connector pads for contacting the Y contacts, such that when the connector edge of the display is received in the electrical connector, some or all of connector pads connect to the contacts on the display.

16. A display assembly as claimed in claim 15, wherein the X contacts are each placed along the connecting edge of the display at regular intervals, and wherein the X connector pads are each placed at regular intervals on the electrical connector, the size of the intervals between the X connector pads being at most half of the size of the intervals between the X contacts, and wherein a sensing circuit is provided for sensing which X connector pads on the connector are connected to the X contacts on the display.

17. A display assembly as claimed claim 16, wherein the sensing circuit is operable to detect if adjacent X contacts or adjacent Y contacts are connected together.

18. A display assembly as claimed claim 17, wherein the display is provided with a conducting region at one or both ends of the connecting edge to allow the sensing circuit to sense the lateral position of the connecting edge in the connector.

* * * * *